United States Patent
Weiss et al.

[19]

[11] Patent Number: 5,927,458
[45] Date of Patent: Jul. 27, 1999

[54] PRESSURE PLATE ARRANGEMENT

[75] Inventors: Michael Weiss, Dittelbrunn; Reinhold Weidinger, Unterspiesheim, both of Germany

[73] Assignee: Mannesmann Sachs AG, Schweinfurt, Germany

[21] Appl. No.: 08/935,042

[22] Filed: Sep. 22, 1997

[30] Foreign Application Priority Data

Sep. 23, 1996 [DE] Germany ............................ 196 38 909

[51] Int. Cl.⁶ .................................................. F16D 13/75
[52] U.S. Cl. .................................. 192/70.25; 192/111 A; 192/30 W
[58] Field of Search ............................ 192/70.25, 111 A, 192/30 W

[56] References Cited

U.S. PATENT DOCUMENTS

| | | |
|---|---|---|
| 3,485,330 | 12/1969 | Reiff . |
| 5,540,313 | 7/1996 | Weidinger ............................. 192/70.25 |
| 5,690,203 | 11/1997 | Link et al. ............................. 192/70.25 |

FOREIGN PATENT DOCUMENTS

| | | |
|---|---|---|
| 295 07 449 | 8/1995 | Germany . |
| 2 287 994 | 10/1995 | United Kingdom . |
| 2 294 098 | 4/1996 | United Kingdom . |
| 2 298 251 | 8/1996 | United Kingdom . |
| 2 311 102 | 9/1997 | United Kingdom . |
| 2 311 339 | 9/1997 | United Kingdom . |
| 2 312 256 | 10/1997 | United Kingdom . |

*Primary Examiner*—Rodney H. Bonck
*Attorney, Agent, or Firm*—Cohen, Pontani, Lieberman & Pavane

[57] ABSTRACT

A pressure plate arrangement 10 including a housing 12 that is fixedly connected to a flywheel 14 and rotatable therewith about an axle. A pressure plate 16 is arranged in the housing 12 so as to be adjustable in the axial direction. The pressure plate 16 may be prestressed in the direction of the flywheel 14 by an energy storage device 18. Interposed between the energy storage device 18 and the pressure plate 16 is a wear compensation device 26. The pressure plate arrangement 10 also includes at least one clearance indicator 31 which is supported on the pressure plate 16 by a friction clamping seat. The clearance indicator 31 detects wear that has occurred during operation by means of relative movement between the pressure plate 16 and a further component of the pressure plate arrangement 10 and brings about an axial repositioning corresponding to the wear using the wear compensation device 26.

14 Claims, 4 Drawing Sheets

PRESSURE PLATE ARRANGEMENT

BACKGROUND OF THE INVENTION

1. Field of the Invention

The present invention relates to a pressure plate arrangement, and in particular for a motor vehicle friction clutch with automatic wear compensation. The pressure plate arrangement comprises a housing that can be connected fixedly to a flywheel and rotated with the flywheel about an axle. A pressure plate is connected to the housing in a substantially rotation-proof manner that is axially displaceable in the housing between an engagement position and a disengagement position. An energy storage device such as a diaphragm spring is operatively connected between the pressure plate and the housing. The energy storage device is supported by the housing in the axial direction. At the same time, the energy storage device is supported by the pressure plate via a wear compensation device and prestresses the pressure plate, relative to the housing, into the engagement position. In the engagement position, the pressure plate is preferably supported by the flywheel via friction linings of a clutch disk. The pressure plate arrangement further comprises at least one clearance indicator, which is arranged on the pressure plate. The clearance indicator has a wear detection section for detecting wear of the friction linings. Moreover, the clearance indicator includes a wear compensation section that interacts with the wear compensation device in order to compensate for the detected wear. In addition, the clearance indicator has a clamping seat section, by which the clearance indicator is held by the friction clamping seat on the pressure plate. When wear is detected by the wear detection section, the friction clamping seat may be substantially neutralized and the clearance indicator may be shifted, relative to the pressure plate, based on the amount of detected wear.

2. Description of the Related Art

A pressure plate arrangement is disclosed, for example, in German Patent Publication 295 07 449 U1. In this known pressure plate arrangement, the clearance indicator includes a bolt that extends substantially in the axial direction and penetrates a boring located radially outside of the pressure plate. For the purpose of detecting wear, a free end section of the bolt can be brought to rest on the flywheel of a clutch that is equipped with this pressure plate arrangement. A lever section located at the other end of the bolt rests, with its radially inner end, on the wear compensation device, so that the latter is blocked in the axial direction by the wear compensation section formed by the lever section. Arranged between the bolt of the clearance indicator and the radially inner end of the lever section is a second bolt, which extends axially from the pressure plate and penetrates an opening in the lever section. The clearance indicator is prestressed in a friction clamp seating on the pressure plate by means of two helical compression springs. A first helical compression spring acts between the free end of the bolt that penetrates the pressure plate and the pressure plate itself. A second helical compression spring acts further inward radially between the pressure plate and the lever section, and surrounds the second bolt located on the pressure plate. The spring action produces a tilting moment, which causes the bolt that penetrates the pressure plate to tilt in its opening, where it is fixed in place by means of friction clamping. When wear occurs, the clearance indicator is shifted out of its friction clamping seat against the spring force and moves in the axial direction accordingly based on the extent of detected wear. A subsequent disengagement movement, in which the wear compensation device is released by the diaphragm spring, allows this device to lengthen in the axial direction until it again comes to rest on the lever section.

A disadvantage associated with this type of pressure plate arrangement is that the bolt serving as the wear detection section and penetrating the pressure plate protrudes—in the case of pressure plate arrangements not composed of a flywheel and a clutch disk—over a base area of the pressure plate. This creates the risk that, during transport, an unintentional force will be exercised on the clearance indicator causing it to shift from the preassembled position into a position that corresponds to an operating position in which the clearance indicator has already detected wear. If such an unintentional movement goes unnoticed and the pressure plate arrangement is then assembled with a flywheel, the clearance indicator will not properly perform its wear-detecting function, at least not when the clutch begins operation.

Furthermore, such an unintentional movement of the clearance indicator also allows the wear compensation device to expand in the axial direction, so that later, when the pressure plate arrangement is assembled with a flywheel, the pressure plate has already moved too far toward the flywheel. Before assembling a clutch, it is therefore necessary to inspect all pressure plate arrangements of this type to determine whether any unintentional movement of the clearance indicator has taken place.

In addition, this conventional pressure plate arrangement is disadvantageous in that the clearance indicator, in order to detect the clearance relative to the flywheel, must penetrate the pressure plate with the bolt. The bolt section of the clearance indicator must therefore be arranged radially outside of the area where the clutch disk with the friction linings is positioned. It is not possible to move the bolt section radially inward because the clutch disk and its friction linings must be freely rotatable relative to the pressure plate and the flywheel. Furthermore, the structural size of this known pressure plate arrangement must be large enough for the bolt section of the clearance indicator to be arranged radially outside of the clutch disk in order to be connected to the pressure plate arrangement.

SUMMARY OF THE INVENTION

The present invention provides a pressure plate arrangement that, while relatively simple in design and as small as possible in structural size, reliably avoids the unintentional exercise of force on the clearance indicator. According to the invention, this object is attained by a pressure plate arrangement, in particular for a motor vehicle friction clutch with automatic wear compensation, that includes a housing fixedly connected to a flywheel and rotated with the flywheel about an axle. A pressure plate is connected to the housing in a substantially rotation-proof manner so as to be moved axially in the housing between an engagement position and a disengagement position. An energy storage device, for example, a diaphragm spring, acts between the pressure plate and the housing. The energy storage device is supported by the housing in the axial direction. At the same time, the energy storage device is supported by the pressure plate via a wear compensation device and prestresses the pressure plate, relative to the housing, into the engagement position. In the engagement position, the pressure plate is preferably supported on the flywheel via friction linings of a clutch disk. The pressure plate arrangement further comprises at least one clearance indicator, which is arranged on the pressure plate. The clearance indicator has a wear detection section for detecting wear of the friction linings. In addition, the clearance indicator includes a wear compensation section, which interacts with the wear compensation device so as to compensate for the detected wear, and a clamping seat section, with which the indicator is held by a friction clamping seat on the pressure plate. When wear is detected by the wear detection section, the friction clamping seat may be substantially neutralized and the clearance indicator may be shifted, relative to the pressure plate, based on the detected wear.

In the pressure plate arrangement according to the invention, the wear detection section detects wear as a function of the relative movement between the pressure plate and a further component of the pressure plate arrangement due to wear.

Therefore, in the pressure plate arrangement according to the invention, the clearance indicator sections need not protrude over the structural space of the pressure plate arrangement after assembly with the clutch disk and flywheel in order, for example, to come to rest on the flywheel. Because such sections are avoided, all components of the clearance indicator may be accommodated inside the pressure plate arrangement and are thus protected against unintentional forces acting from the outside, for example, during transport. In addition, the pressure plate arrangement according to the invention is advantageous in that it does not require that any clearance indicator sections be arranged radially outside the area of the clutch disk when a motor vehicle clutch is in the assembled state. It is therefore possible to shift the various components of a clearance indicator radially to the inside and thus reduce the radial structural size of the pressure plate arrangement according to the invention.

Advantageously, it is thereby possible for the energy storage device to be a diaphragm spring and for the wear compensation section to detect wear based on the relative movement between the diaphragm spring and the pressure plate.

The clearance indicator, of which there is at least one, can be guided and affixed to the pressure plate in an relatively simple and reliable manner by providing a guidance bolt for the clearance indicator on a side of the pressure plate facing away from the flywheel. The guidance bolt extends substantially axially and penetrates an axial opening in the clamping seat section of the clearance indicator, and the clearance indicator is prestressed by spring force in the friction clamping seat on the guidance bolt. Moreover, the guidance bolt ensures that substantially all components of the clearance indicator rest in the axial direction on the side of the pressure plate facing away from the flywheel.

The wear compensation section of the clearance indicator may be supported on the wear compensation device on a side farthest away from the pressure plate. Then the wear compensation device may be prestressed by spring force for the purpose of axial lengthening in so that the wear compensation device is held in the axial direction between the pressure plate and the wear compensation section.

To allow the friction clamping seat of the clearance indicator to be released more simply and reliably in the area of its clamping seat section on the pressure plate, when a relative movement is detected between the diaphragm spring and the pressure plate due to wear, the wear detection section is moved in the axial direction by the diaphragm spring, relative to the pressure plate so as to generate a swiveling movement of the clearance indicator about its support surface on the wear compensation device.

If the pressure plate arrangement is constructed so that the diaphragm spring is supported on the housing in a radially center area and acts on the pressure plate via the wear compensation device in a radially outer area, and if the guidance bolt is arranged radially inside of the wear compensation device, then the radial structural size of the pressure plate arrangement according to the invention may be further reduced, because all essential components of the clearance indicator may be arranged radially inside of the wear compensation device.

For example, in an embodiment of the invention the wear detection section of the clearance indicator may be arranged radially outside of the wear compensation section and, when wear occurs, be movable toward the pressure plate by means of the diaphragm spring. In an alternative embodiment the wear detection section may be arranged radially inside of the clamping seat section and, when wear occurs, be movable away from the pressure plate by means of the diaphragm spring. This alternate embodiment may be accomplished by constructing the pressure plate arrangement so that the diaphragm spring has an axial opening, disposed radially inside of its support on the housing. The axial opening is of a sufficient size and accordingly disposed so that the wear detection section of the clearance indicator passes through the axial opening of the diaphragm spring in such a way that the wear detection section acts upon a side of the diaphragm spring facing away from the pressure plate radially inside of its support on the housing. Furthermore, it is possible for the wear detection section to detect wear by interaction with the housing.

The friction clamp seating of the clearance indicator on the pressure plate can, alternatively, be simply established by prestressing the clearance indicator into the friction clamping seat by means of a leaf spring element. The leaf spring element is preferably connected at one end section to the clearance indicator and supported at an opposite end, preferably, via a radial circumferential shoulder of the guidance bolt arranged closest to the pressure plate.

The present invention also relates to a motor vehicle friction clutch with a pressure plate arrangement, in which the occurrence of wear between the pressure plate and a further pressure plate arrangement component is detected.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
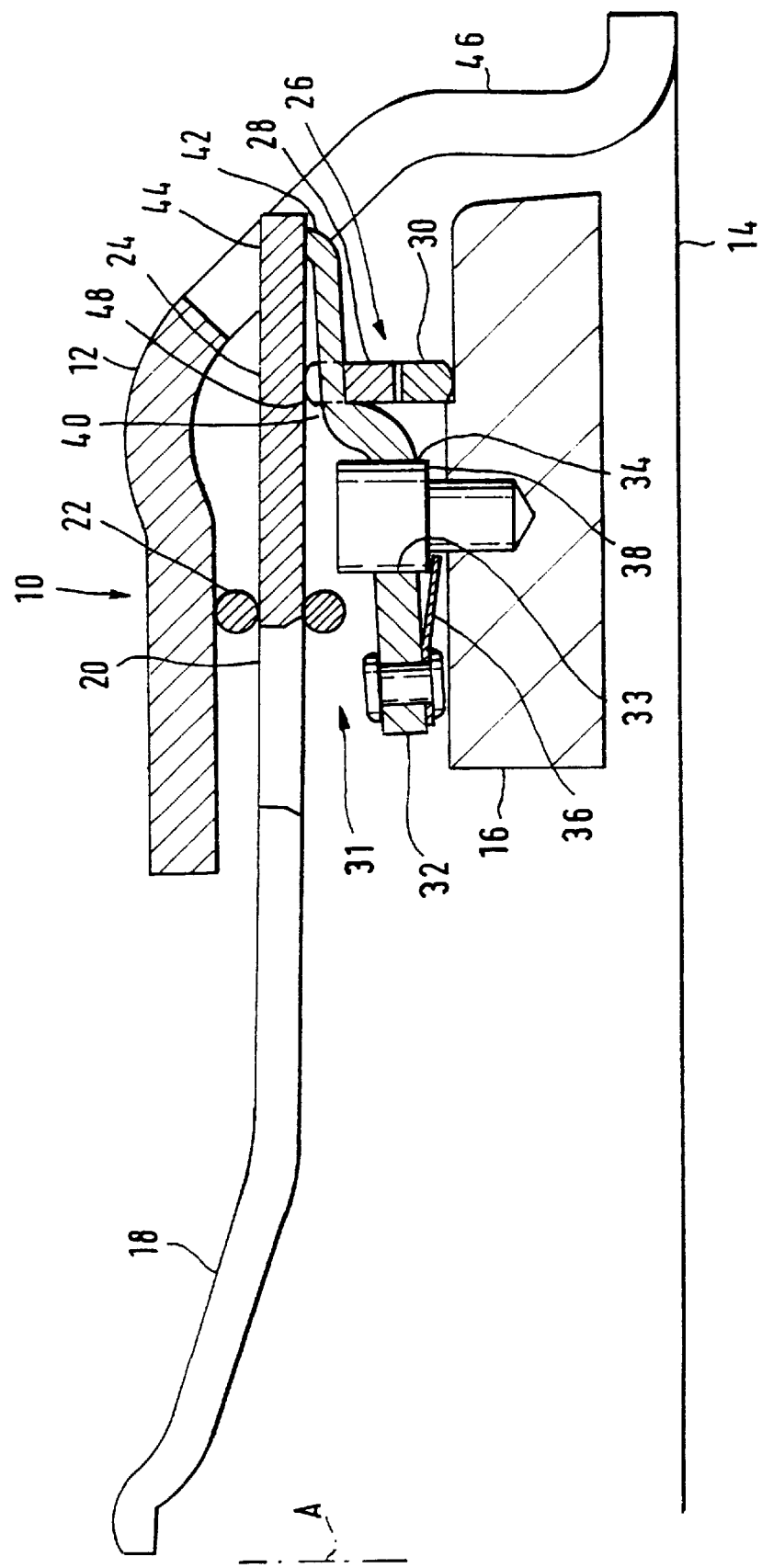
FIG. 1 is a longitudinal cross-sectional view of the pressure plate arrangement in accordance with the present invention.
Figure 2:
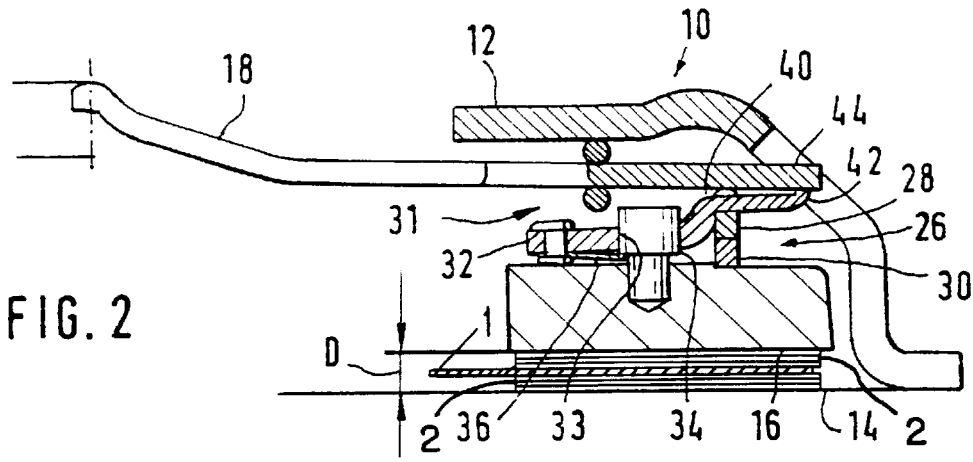
FIG. 2 is a longitudinal cross-sectional view of the pressure plate arrangement of FIG. 1 in a new condition and in an engaged state.

FIG. 1 shows a pressure plate arrangement according to the invention, identified generally by reference number 10. The pressure plate arrangement 10 comprises a housing 12, which is fixedly connected to a flywheel 14 (shown only schematically in FIG. 1) in a radially outer area, for example, by screws or the like. The flywheel 14 does not constitute part of the pressure plate arrangement 10, but instead constitutes part of a motor vehicle clutch assembled with the present inventive pressure plate arrangement 10. A pressure plate 16 is arranged in the housing 12. In a known manner, the pressure plate 16 may be displaced in the housing 12 of the pressure plate arrangement 10 in the direction of a rotary axis A, but is connected to the housing 12 in a substantially rotation-proof manner, for example, via tangential springs. In the assembled state of a clutch constructed in this manner, a clutch disk 1 is arranged between the pressure plate 16 and the flywheel 14, with intermediate friction linings 2, as shown in FIG. 2. When the clutch is engaged, the clutch disk is held in place by clamping action between the pressure plate 16 and the flywheel 14.

The pressure plate 16 is prestressed in the direction of the flywheel 14 by a diaphragm spring 18. For this purpose, the diaphragm spring 18 is supported by the housing via a wire ring 22 in a radially center area 20 and is supported on the pressure plate 16 in a radially outer area 24 by a wear compensation device 26.

The wear compensation device 26 comprises two rings 28, 30 arranged axially consecutive to each other. The two rings 28, 30 have complementary slanted surfaces on their respective faces that rest upon one another. As a result, when the rings 28, 30 rotate relative to each other due to spring prestressing, the wear compensation device 26 lengthens axially.

Pressure plate arrangement 10 in FIG. 1 also includes a clearance indicator 31. The clearance indicator 31 is formed by a lever 32, which, with an axial opening that forms a clamping seat section, is seated on a guidance bolt 34 attached to the pressure plate 16. In FIG. 1, the lever element 32 is prestressed in the counterclockwise direction, that is, away from the flywheel 14, by means of a leaf spring 36, which is attached to the lever 32 by a rivet or the like and supported on a radial circumferential shoulder 38 of the guidance bolt 34. The lever element 32 is thus held by a friction clamping seat 33 with its axial opening on the bolt 34. The bolt 34 is arranged radially inward of the wear compensation device 26.

The lever 32 extends radially outward beyond the guidance bolt 34 via a curved section and rests, along a wear compensation section 40 of the clearance indicator, on the face of the wear compensation device 26, that is, on the ring 28 that faces farthest away from the pressure plate 16. From this support point, the lever 32 extends further radially outward to form a wear detection section 42 of the clearance indicator 31 that interacts, with a tongue-like elongation 44 that extends radially outward from the diaphragm spring 18, as described below, so as to detect any wear which occurs during the operation of the pressure plate arrangement 10. As shown in FIG. 1, the elongation 44 of the diaphragm spring 18 and the wear detection section 42 of the clearance indicator 31 extend radially outward into a suitable recess 46 in the housing 12. To permit the arrangement of the clearance indicator 31 and the diaphragm spring 18, as shown in FIG. 1, the ring 28 has a recess 48 so as to accommodate the clearance indicator 31 when displaced in the axial direction. The recess 48 is provided in the ring 28 in a circumferential segment associated with the wear compensation section 40 of the lever 32.

The functioning of the present inventive pressure plate arrangement 10 equipped in a clutch with friction linings will now be described with reference to FIGS. 2 to 6. FIG. 2 shows the pressure plate arrangement 10 according to the invention in a new condition, that is, where the friction linings of the clutch have not yet become worn. The pressure plate arrangement 10 in FIG. 2 is in an engaged state, in which the pressure plate 16 is moved toward the flywheel 14 to the maximum extent and is displaced from the flywheel 14 by an axial distance D. In this engaged state, the wear detection section 42 is only in surface contact with the elongation 44 of the diaphragm spring 18 so that the clearance indicator 31 is held with its axial opening in the friction clamping seat 33 on the guidance bolt 34. On the one hand, the wear compensation device 26 is held in the axial direction between the pressure plate 16 and the wear compensation section 40 of the lever 32. On the other hand, the wear compensation device 26 is held in the axial direction between the diaphragm spring 18 and the pressure plate 16.

Figure 3:
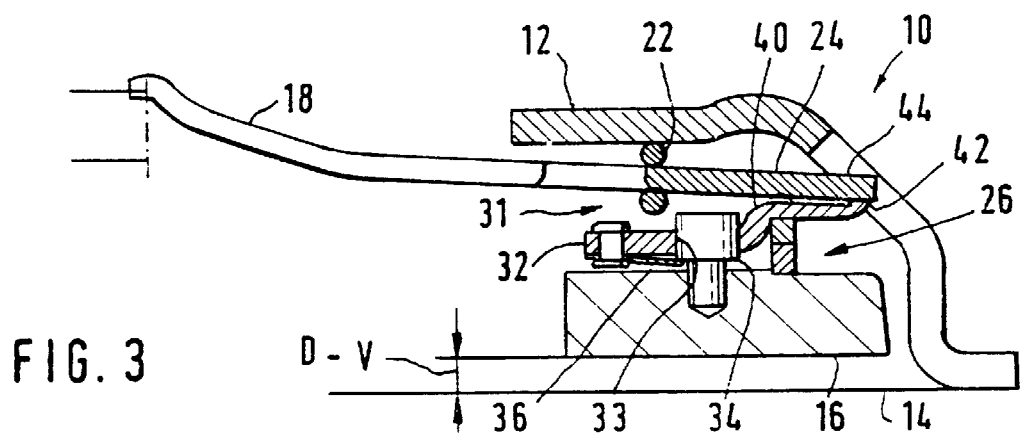
FIG. 3 is a longitudinal cross-sectional view of the pressure plate arrangement of FIG. 1 in a worn condition and in an engaged state.

When wear occurs on the friction linings during operation of a clutch equipped with the inventive pressure plate arrangement 10, the pressure plate 16 moves into the position shown in FIG. 3. In this position, the axial distance D between the pressure plate 16 and the flywheel 14 is reduced by the wear amount V. This axial shift of the pressure plate 16 toward the flywheel 14 causes the diaphragm spring 18, in its radially outer area 24, to swivel about the wire ring 22 in the clockwise direction, that is, toward the flywheel 14. The diaphragm spring 18 in its radially outer area 24 and the pressure plate 16 thereby axially approach one another. The elongation 44 of the diaphragm spring 18 thus presses on the wear detection section 42 of the clearance indicator 31, so that the lever 32 swivels in the clockwise direction about the support point of the wear compensation section 40 on the wear compensation device 26. This swiveling motion is accomplished against the force of the leaf spring 36, so that the clamping seat 33 of the lever 32 with its axial opening on the guidance bolt 34 is also released. Upon release of the clamping seat of the lever 32 on the guidance bolt 34, the entire lever 32, due to the swiveling motion, is moved in the axial direction away from the pressure plate 16 in an area radially inside of the wear compensation device 26.

Figure 4:
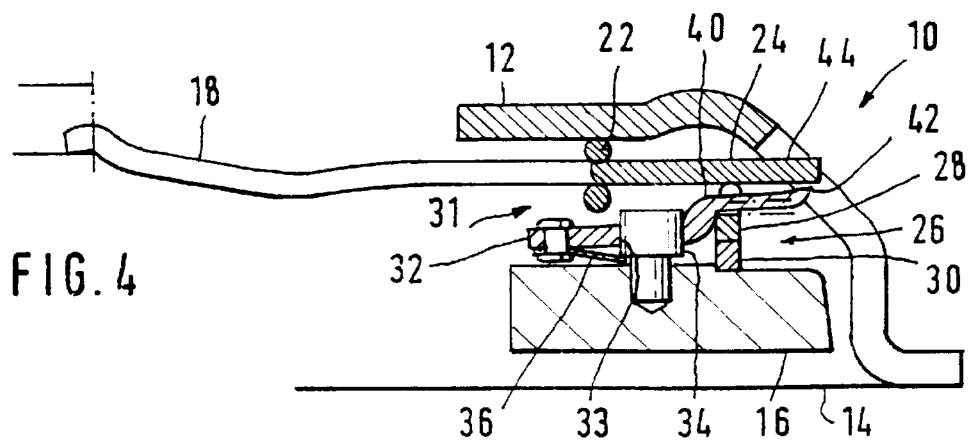
FIG. 4 is a longitudinal cross-sectional view of the pressure plate arrangement of FIG. 1 in a partially disengaged state.

If the clutch is then disengaged, it first enters a partially disengaged state, which is shown in FIG. 4. During the transition into the partially disengaged state, the diaphragm spring 18 is swiveled in its radially outer area 24 along with the elongation 44 in the counterclockwise direction about the wire ring 22. This swiveling movement is also performed by the lever 32 which swivels from the position shown in dashed lines in FIG. 4 into the position denoted by a solid line in FIG. 4. The swiveling movement of the lever element 32 is caused by the leaf spring 36. However, in the engaged state with wear shown in FIG. 3, the lever 32 is drawn axially away from the pressure plate 16 as a result of the swiveling movement. Thus, in the state illustrated in FIG. 4, the lever element 32 is shown in a position further removed from the pressure plate 16 and again reaches the friction clamping seat 33 on the guidance bolt 34. Moreover, the axial distance between the pressure plate 16 and the wear compensation section 40 of the lever 32 is also enlarged. Since the pressure plate 16 follows the swiveling movement of the diaphragm spring 18 due to the relatively low force of the tangential springs connecting the pressure plate 16 to the housing 12, only a relatively low axial force is available between the pressure plate 16 and the diaphragm spring 18. As a result, the wear compensation device 26 is able, by relative rotation of its two rings 28, 30, to take up the wear that has occurred. In particular, the two rings 28, 30 can rotate relative to one another until the elongation that their rotation causes in the wear compensation device 26 corresponds to the new axial distance between the wear compensation section 40 of the lever 32 and the pressure plate 16. After the compensation device 26 has been axially elongated in order to compensate for wear, the wear compensation device 26 is again clamped in the axial direction between the lever 32 and the pressure plate 16 thereby inhibiting further axial expansion.

Figure 5:
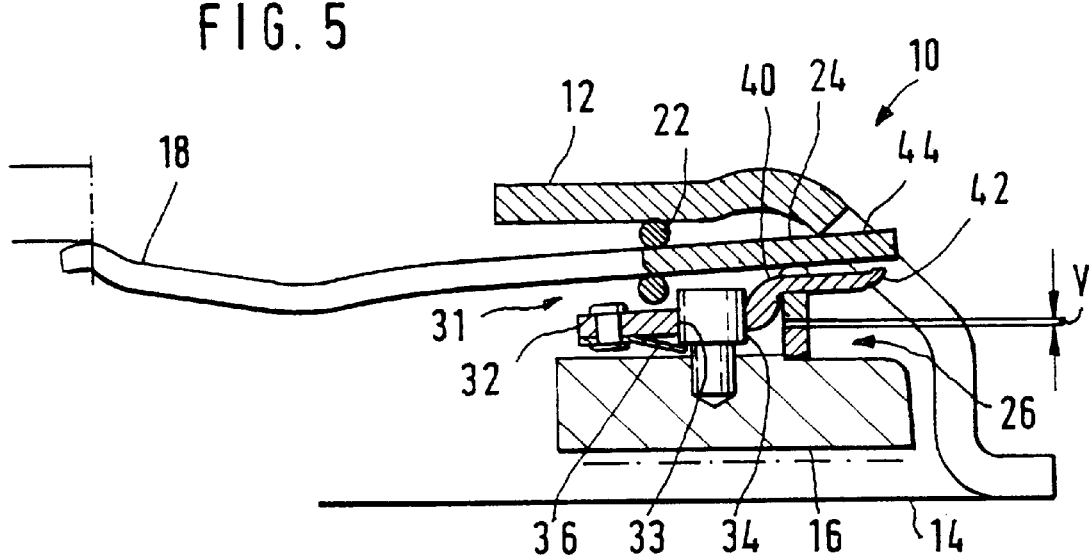
FIG. 5 is a longitudinal cross-sectional view of the pressure plate arrangement of FIG. 1 in a fully disengaged state.

The diaphragm spring 18 then moves from the partially disengaged position shown in FIG. 4 back into the fully disengaged position shown in FIG. 5. In the latter position, the diaphragm spring 18 in its radially outer section 24 is swiveled so far in the counterclockwise direction as to lift clear of the wear detection section 42 of the clearance indicator 31. In the state shown in FIG. 5, V is the amount-of detected wear which has been compensated for by axial elongation of the wear compensation device 26. In the state shown in FIG. 5, the wear compensation device 26, has been prestressed by the tangential springs so as to remain at rest on the diaphragm spring 18.

Figure 6:
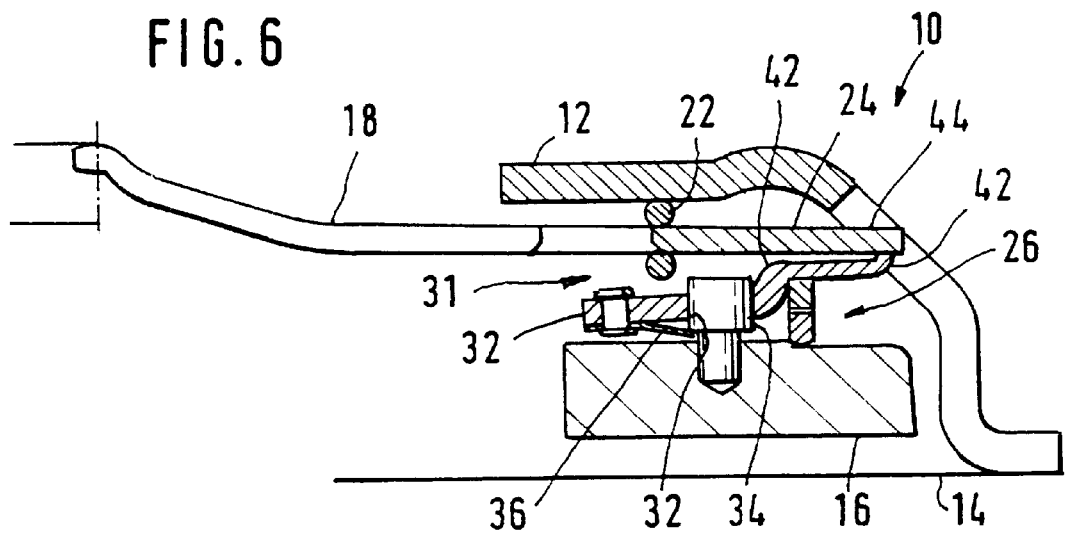
FIG. 6 is a longitudinal cross-sectional view of the pressure plate arrangement of FIG. 1 in an engaged state with the detected wear compensated.

In FIG. 6, the clutch is again shown in the engaged state, in that the diaphragm spring 18 is released and, in its radially outer area 24, again presses the pressure plate 16 toward the flywheel 14 by way of the wear compensation device 26. The position shown in FIG. 6 is similar to that shown in FIG. 2 with the exception that in FIG. 6 the lever 32 is axially displaced from the pressure plate 16 by a distance corresponding to the amount of wear V. The wear that has occurred in the axial area between the pressure plate 16 and the flywheel 14 is compensated for by the axial elongation of the wear compensation device 26, so that the diaphragm spring 18 in FIG. 6 is in the same position as it was in the newly engaged state shown in FIG. 2. Thus, even after wear occurs the same disengagement forces are required because the diaphragm spring 18 is always moved into the same position, regardless of the wear situation.

As FIGS. 1 to 6 illustrate, all components of the clearance indicator 31 according to the invention are accommodated axially between the pressure plate 16 and the diaphragm spring 18. In other words, all components of the clearance indicator 31 are incorporated into the structural area of the pressure plate arrangement 10. None of the components which comprise the clearance indicator 31 protrude in the axial direction over the pressure plate 16 or the pressure plate arrangement 10. As a result, during transport of a pressure plate arrangement constructed in accordance with the invention, undesired movements of the clearance indicator 31, as can occur in the prior art cited above, are avoided.

To allow the pressure plate arrangement to be transported to the desired assembly site in the prepared installation position shown in FIG. 1, transport safety means may be provided to hold the pressure plate 16 in its position withdrawn into the housing 12, that is, in a position that corresponds essentially to the disengagement position of a clutch equipped with such a pressure plate arrangement 10, as shown in FIG. 1. This substantially reduces or prevents the pressure plate 16 from moving so far in the axial direction, due to the prestressing force of the diaphragm spring 18 and the lack of counterforce from the flywheel 14 and a clutch disk (not shown), that the surface contact that exists in the new state between the elongation 44 of the diaphragm spring 18 and the wear detection section 42 of the clearance indicator 31 results, due to excessive swiveling of the diaphragm spring 18, in the tilting of the lever elements 32 of the clearance indicator 31.

Figure 7:
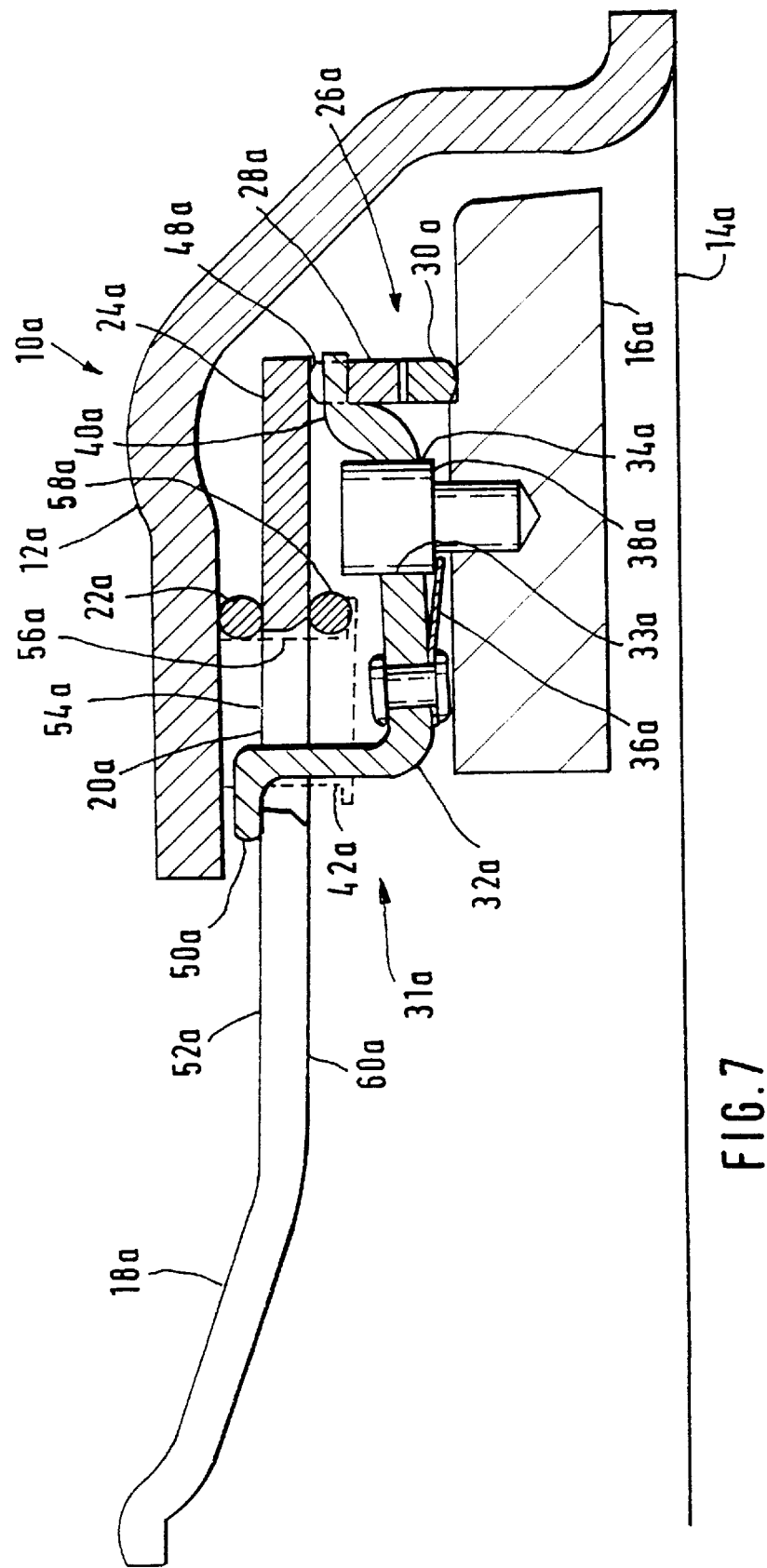
FIG. 7 is an alternative embodiment of the pressure plate arrangement in accordance with the present invention.

A second embodiment of the pressure plate arrangement 10a according to the invention is shown in FIG. 7. Elements in FIG. 7 which are similar to those shown in FIGS. 1 to 6 have the same reference numbers, with an "a" added. Because a substantial number of the elements shown in the embodiment in FIG. 7 correspond to those elements previously described and shown in FIGS. 1 to 6, only the differences are discussed below.

In the embodiment in FIG. 7, the wear detection section 42a is not, as in the previous embodiments, arranged radially outside of the wear compensation section 40. Rather, wear detection section 42a is arranged radially inside of the clamping seat section 33a formed by the axial opening. In particular, the wear detection section 42a is substantially S-shaped and extends axially through an opening 54a in the diaphragm spring 18a and has a support section 50a which comes to rest on a surface 52a of the diaphragm spring 18a that faces away from the pressure plate 16a.

The diaphragm spring 18a, in a known manner, has a plurality of openings 54a along its radially center area 20a. These openings 54a are generally used to hold holding elements 56a (shown in broken lines in FIG. 7), which, in turn, hold the diaphragm spring 18a, with intermediate mounting of the wire ring 22a and a wire ring 58a, in both axial directions relative to the housing 12a. A holding element 56a, however, is not provided at each opening 54a in the circumferential direction. Thus, where no such holding element 56a is provided, for example, at the opening 54a shown in FIG. 7, the wear detection section 42a can pass through the diaphragm spring 18a without interfering with or being interfered by a holding element.

The operation of the pressure plate arrangement 10a in accordance with the second embodiment, as shown in FIG. 7, corresponds essentially to that previously described with respect to the first embodiment as shown in FIGS. 1 to 6. In particular, an axial movement of the pressure plate 16a in the direction of the flywheel 14a that occurs in the event of wear results in a swiveling motion of the diaphragm spring 18a about the wire ring 22a. A radially inner section 60a of the diaphragm spring 18a thereby moves away from the pressure plate 16a in the axial direction together with the wear detection section 42a of the clearance indicator 31a. As a result, the lever element 32a swivels about the support area of the wear compensation section 40a on the ring 58a, which releases the friction clamping seat 33a of the lever element 32a with its axial opening on the bolt 34a. Upon release of the friction clamping seat 33a, the lever element 32a is moved away axially from the pressure plate 16a to an extent corresponding to the wear that has occurred, as previously described above with respect to the first embodiment. Because the further process of wear compensation by means of the wear compensation device also corresponds to the embodiment described in FIGS. 1 to 6, reference is hereby made to the above descriptions.

In the embodiment in FIG. 7, there are, once again, no components of the clearance indicator 31a that protrude axially over the pressure plate arrangement 10a. Furthermore, this embodiment has the advantage that wear is detected between two components of the pressure plate arrangement that distance themselves in the axial direction when wear occurs. As a result, detection accuracy is increased because the relative movement of the two components between which wear is to be detected, enlarged by a certain factor, is associated with a certain amount of wear.

As shown in FIG. 7, in an embodiment of the pressure plate arrangement 10a of this type it is not necessary to provide an opening in the housing 12a to accommodate an elongation of the diaphragm spring or a wear detection section of the clearance indicator. Moreover, because the elongation 44 shown in the first embodiment in FIG. 1 is not needed in the second embodiment, there is no danger that the spring characteristic of the diaphragm spring will be impaired due to elongation.

Various modifications are contemplated and within the intended scope of the pressure plate arrangements shown in FIGS. 1 to 7. For example, it is possible to arrange the bolt radially outside of the wear compensation device and to adjust the various sections of the clearance indicator, for example, the clamping seat section, wear detection section and wear compensation section, designed to the correct positioning of the bolt. It is also possible to detect wear between the pressure plate and the housing. For example, the wear between the pressure plate and the housing can be detected by modifying the second embodiment of the pressure plate arrangement shown in FIG. 7 so that the housing 12a also has an opening oriented with the opening 54a and the wear detection section 42a is elongated in the axial direction so as to also pass through the opening in the housing 12a.

For purposes of illustration only, a single clearance indicator is shown in FIGS. 1 to 7, however, even though a single clearance indicator suffices for proper functioning of the pressure plate arrangement 10a according to the invention, a plurality of clearance indicators and associated components may be arranged consecutively in the circumferential direction of a pressure plate arrangement.

The present invention has been described above in reference to a pressed clutch, which can be brought into a disengaged state by applying a pressure force on the radially inner area of the diaphragm spring. The present invention is also suitable for clutches of the drawn type. In such an embodiment, the diaphragm spring is mounted on the housing radially outside of the wear compensation device and acts on the pressure plate, via the wear compensation device, radially inside the mounting point. Even in an embodiment of this type, swiveling motions of the diaphragm spring take place when wear occurs; in particular, swiveling motions in the direction of the pressure plate are carried out in the radially inner area of the diaphragm spring. It is therefore possible, as described above with respect to the other embodiments, to detect such relative movement between the diaphragm spring and the pressure plate by a clearance indicator constructed as described above.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A pressure plate arrangement for a motor vehicle friction clutch disk with friction linings and automatic wear compensation of the friction linings, comprising:

a flywheel;

a housing fixedly connected to said flywheel and rotatable with said flywheel about a predetermined axis;

a pressure plate fixedly connected in a substantially rotation-proof manner to said housing so as to prevent rotation and axially displaceable therein between an engagement position and a disengagement position;

an energy storage device disposed between said pressure plate and said housing, said energy storage device being supported in an axial direction on said housing and arranged so as to prestress said pressure plate relative to said housing into the engagement position, whereby in the engagement position, said pressure plate is supported on said flywheel by the friction linings of the clutch disk;

a wear compensation device disposed between said energy storage device and said pressure plate so as to support in an axial direction said energy storage device; and a clearance indicator disposed on said pressure plate and having a wear detection section and a wear compensation section, said wear detection section being arranged for detecting wear of the friction linings based on a relative movement between said pressure plate and said energy storage device which is caused by wear and said wear compensation section being operatively connected to the wear compensation device for compensating for the detected wear of the friction linings, said clearance indicator being supported on said pressure plate by a friction clamping seat, whereby upon detection of wear by the wear detection section, the friction clamping seat is substantially neutralized and said clearance indicator is adjusted accordingly relative to said pressure plate to an extent of the detected wear.

2. The pressure plate arrangement in accordance with claim 1, wherein said energy storage device is a diaphragm spring.

3. The pressure plate arrangement in accordance with claim 2, further comprising a guidance bolt disposed on a side of said pressure plate facing away from said flywheel and extending substantially axially through an axial opening in said clearance indicator, said clamping seat comprising said axial opening and said guide bolt, wherein said clearance indicator is prestressed by spring force so that said axial opening and said guidance bolt form the friction clamping seat on said guidance bolt.

4. The pressure plate arrangement in accordance with claim 2, wherein the wear compensation section of said clearance indicator is supported on said wear compensation device on a side farthest away from said pressure plate.

5. The pressure plate arrangement in accordance with claim 4, wherein said wear compensation device is prestressed by spring force for axial elongation so as to hold said wear compensation device in an axial direction between said pressure plate and the wear compensation section.

6. The pressure plate arrangement in accordance with claim 4, wherein the wear detection section is axially displaceable relative to said pressure plate by said diaphragm spring so as to rotate said clearance indicator in a support area about said wear compensation device when a relative movement caused by wear occurs.

7. The pressure plate arrangement in accordance with claim 3, wherein said diaphragm spring is supported on said housing in a radially center area and acts on said pressure plate by said wear compensation device in a radially outside area and said guidance bolt is arranged radially inside relative to said wear compensation device.

8. The pressure plate arrangement in accordance with claim 7, wherein the wear detection section of said clearance indicator is disposed radially outside relative to the wear compensation section and, when wear occurs, is movable toward said pressure plate by said diaphragm spring.

9. The pressure plate arrangement in accordance with claim 7, wherein the wear detection section is arranged radially inside of the friction clamping seat, and when wear occurs, is movable away from said pressure plate by said diaphragm spring.

10. The pressure plate arrangement in accordance with claim 9, wherein said diaphragm spring has an axial opening disposed radially inside of a support of said diaphragm spring on said housing, the wear detection section of said clearance indicator being axially displaceable therethrough the axial opening of said diaphragm spring so as to act on an upper surface of said diaphragm spring facing away from said pressure plate radially inside relative to the support of said diaphragm spring on said housing.

11. The pressure plate arrangement in accordance with claim 3, further comprising a leaf spring element disposed so as to prestress said clearance indicator into the friction clamping seat.

12. The pressure plate arrangement in accordance with claim 11, wherein said leaf spring element is connected at one end to said clearance indicator and supported at an opposite end by said guidance bolt.

13. The pressure plate arrangement in accordance with claim 1, wherein the wear detection section is operatively connected to said housing so as to detect wear of the friction linings.

14. The pressure plate arrangement in accordance with claim 1, wherein said pressure plate is supported on said flywheel by the friction linings of the clutch disk.

* * * * *